Figure 2:
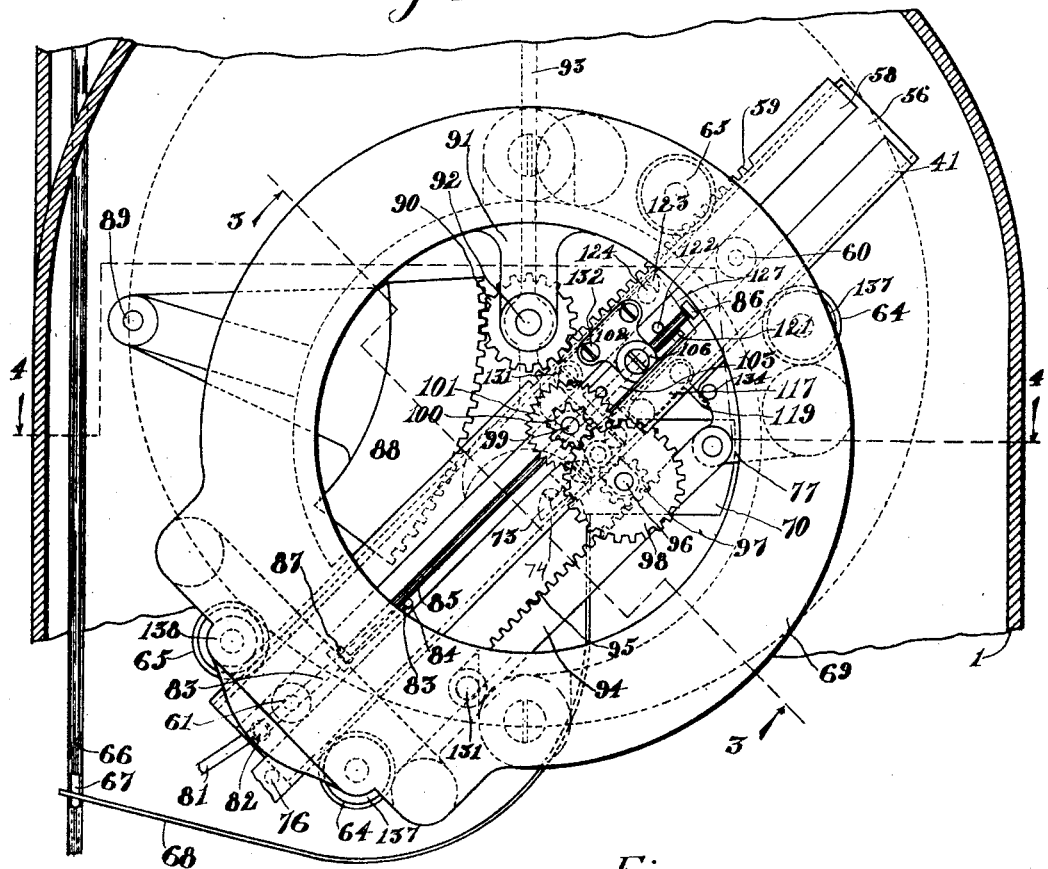

No. 798,731. PATENTED SEPT. 5, 1905.
W. H. JORDAN & C. J. McLEOD.
WEIGHING SCALE.
APPLICATION FILED FEB. 29, 1904.
3 SHEETS—SHEET 1.
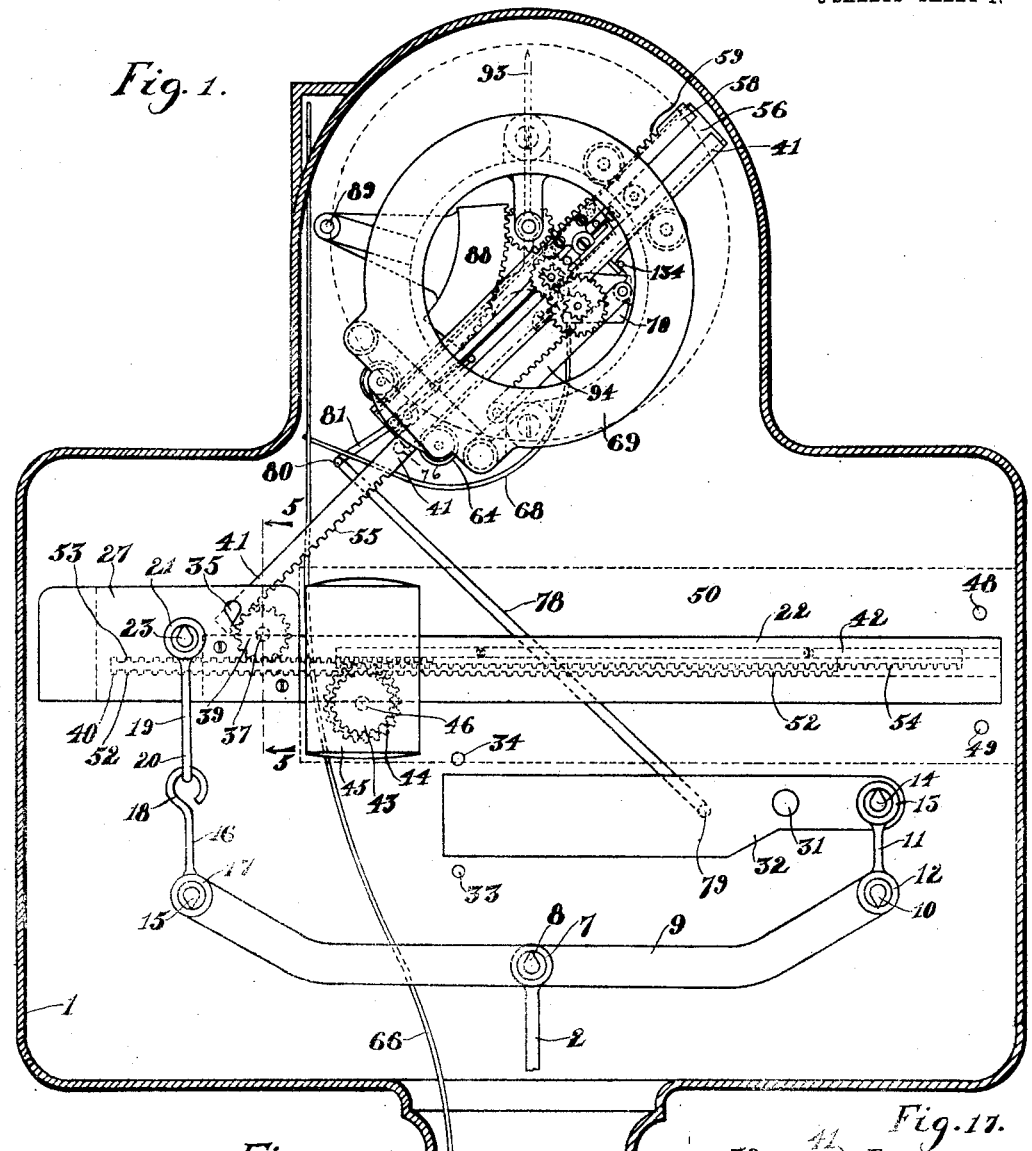
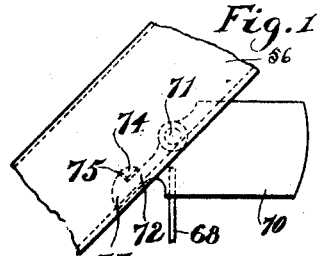
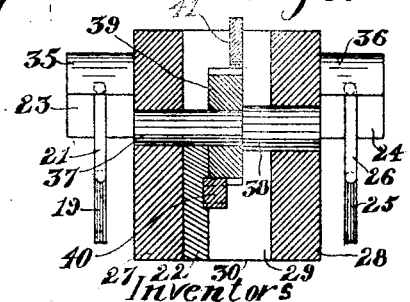
Witnesses:
Robert H. Dring.
Martha E. Golding.
Inventors
Willis H. Jordan,
Clifford J. McLeod.
By Charles F. A. Smith, Atty.

No. 798,731. PATENTED SEPT. 5, 1905.
W. H. JORDAN & C. J. McLEOD.
WEIGHING SCALE.
APPLICATION FILED FEB. 29, 1904.

3 SHEETS—SHEET 2.

Witnesses:
Robert H. Dring.
Martha E. Gooding.

Inventors
Willis H. Jordan,
Clifford J. McLeod.
By Charles F. A. Smith Atty.

No. 798,731. PATENTED SEPT. 5, 1905.
W. H. JORDAN & C. J. McLEOD.
WEIGHING SCALE.
APPLICATION FILED FEB. 29, 1904.
3 SHEETS—SHEET 3.
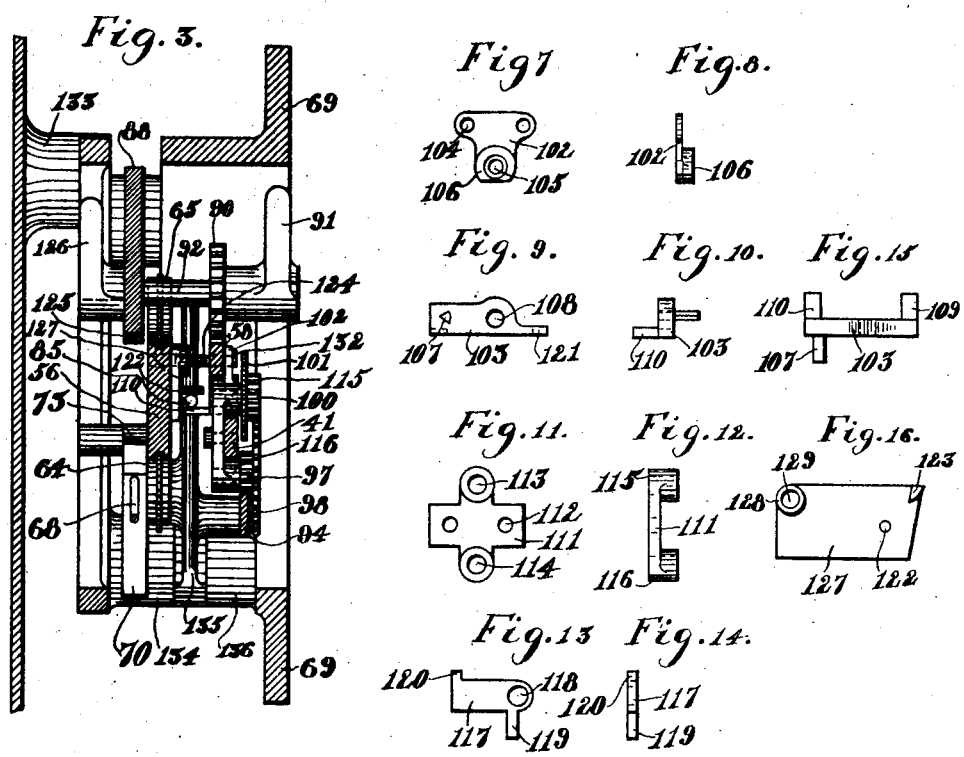
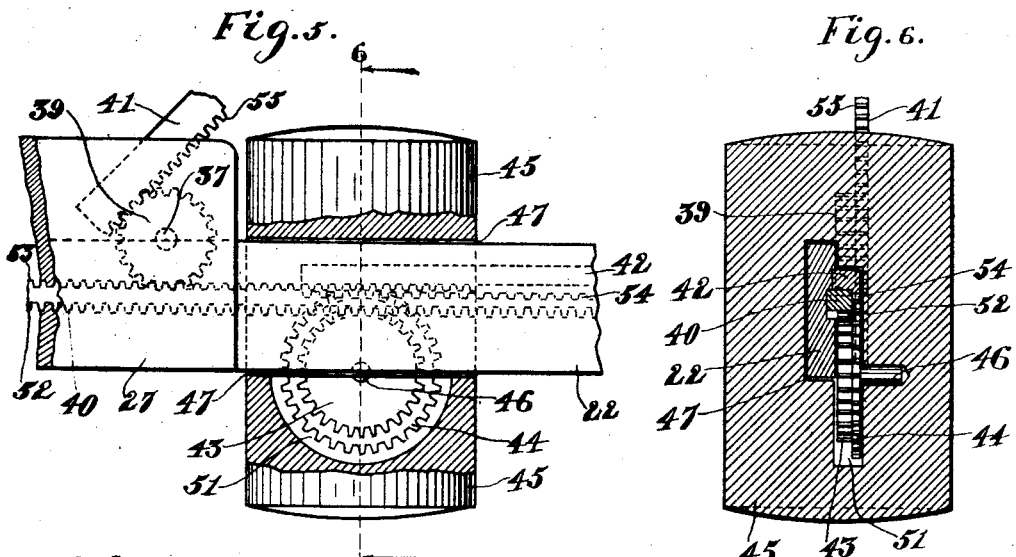
Witnesses:
Robert H. Ling
Martha E. Gooding
Inventors
Willis H. Jordan,
Clifford J. McLeod.
By Charles F. A. Smith Atty.

UNITED STATES PATENT OFFICE.

WILLIS H. JORDAN AND CLIFFORD J. McLEOD, OF BOSTON, MASSACHUSETTS; SAID McLEOD ASSIGNOR TO SAID JORDAN.

WEIGHING-SCALE.

No. 798,731.          Specification of Letters Patent.          Patented Sept. 5, 1905.

Application filed February 29, 1904. Serial No. 195,872.

*To all whom it may concern:*

Be it known that we, WILLIS H. JORDAN and CLIFFORD J. McLEOD, citizens of the United States, residing at Boston, in the county of Suffolk and State of Massachusetts, have invented certain new and useful Improvements in Weighing-Scales, of which the following is a specification, reference being had therein to the accompanying drawings.

This invention relates to improvements in beam-scales, and specifically to a weighing-scale with a beam attachment and having indicating mechanism independent of the beam and whereby it is first necessary to adjust the beam by the movement of the weight-poise in order to ascertain the accurate weight.

Among the salient objects of the invention are to provide a beam weighing-scale that can be used with coin-controlled means that cannot be beaten or give more than one weighing upon the payment of a single toll, and yet the same being of extremely simple and cheap construction and having the parts so arranged as to avoid the necessity of examining the beam to ascertain the weight, as it may be shown upon a dial by the setting in motion of the indicating mechanism, which may be caused by the inserting of a coin in the coin-chute after the weight-poise has been adjusted upon the beam; to provide an improved form of casing to inclose such parts as are not necessary to be touched by the operator in obtaining a weight, the only parts not being inclosed being the weight-poise and that portion of the beam upon which the poise will run; to provide a beam and dial weighing-scale in which there are no springs and in which the knife-bearings are all parallel with each other throughout the entire structure, thereby reducing to a minimum the weight upon the bearings and likewise rendering the scale more sensitive and accurate than any weighing-machine now invented, as well as less susceptible to injury; to provide a construction in which the movement of the poise or movement of the weight upon the scale-platform will operate the mechanical parts, causing the indicator-hand upon the face of the dial to immediately return to zero and prevent further weighing; to provide a construction which may be increased in size without necessitating change of arrangement and at the same time without increasing the length of the beam beyond practical dimensions, and in general to provide an improved construction of the character referred to.

The invention consists in the combination of elements and in certain parts of construction entailed in the combination of said elements to obtain the desired result.

A full understanding of the invention can best be given by a detailed description of a preferred construction embodying the various features of the invention, and such a description will now be given in connection with the accompanying drawings, and we attain our object by the mechanism there illustrated, showing such preferred construction, and the features forming the invention will then be specifically pointed out in the claims.

Figure 4:
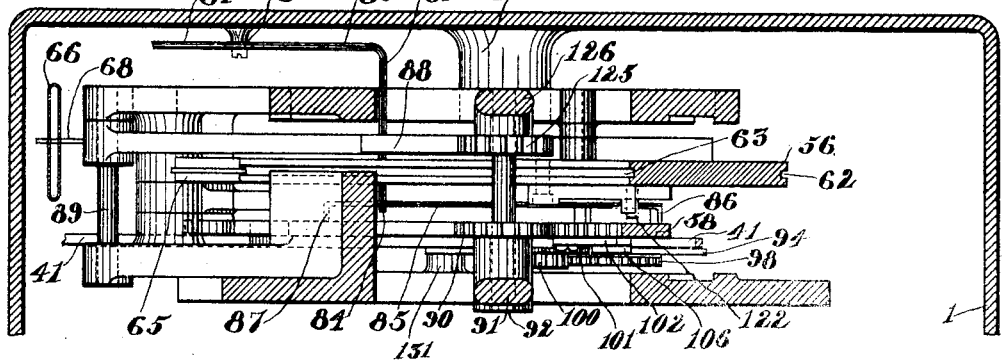

In said drawings, Figure 1 is a front elevation of all the parts of our invention, the case and lower part of the machine being broken away and some of the parts being in dotted lines. Fig. 2 is an elevation of some of the parts shown in Fig. 1 and including most of the dial indicating mechanism. Fig. 3 is a view on the lines 3 3 of Fig. 2 looking in the direction of the arrows. Fig. 4 is a view on the line 4 4 of Fig. 2 looking in the direction of the arrows. Fig. 5 is a front elevation, partly in section, of the weight-poise and part of the beam and contiguous parts. Fig. 6 is a sectional view on the line 6 6 of Fig. 5 looking in the direction of the arrows. Figs. 7 to 16, inclusive, are views of details. Fig. 17 is a view on the line 5 5 of Fig. 1 looking in the direction of the arrows. Fig. 18 is a front view of part of the locking mechanism. Figs. 2 to 18 are drawn on the same scale, being twice the size of the parts shown in Fig. 1.

Latitude is allowed herein as to details, as they may be changed or varied at will without departing from the spirit of our invention and the same yet remain intact and be protected.

Corresponding and like parts are referred to in the following description and indicated in all the views of the drawings by the same reference characters.

Our improvements are adapted for application to ordinary platform weighing-scales, and, as will be seen by the drawings, 1 represents the head-casing, which forms part of the standard and incloses the indicating and most of the weighing mechanism and part of the weighing-beam, the head portion of the casing merely being shown and the standard being broken away just below the head-casing and not shown; and we have also broken the scale-rod 2 away, as shown in Fig. 1 of the drawings, and have not shown the weighing-platform, which rests upon the ordinary compound levers usual in scales of this class and to which the scale-rod 2 is connected in the usual manner, as this construction is so well understood we deem it unnecessary to herein specifically describe or illustrate it. This head-casing may be of any desirable design; but we preferably use a head-casing, as shown in our drawings, with an elongated opening or slot 50, through which the beam 22 extends and upon which the weight-poise 45 runs, and this portion of the beam and weight-poise within this opening or slotted portion are the only parts of the mechanism which can be touched or handled by the operator or person to be weighed.

The usual steelyard or scale-rod 2 has a loop 7, and an upward-turned knife-edge 8 projects through the eye of the loop from a beam-lever of equal arms, each arm being bent upward at its outer end at an angle, so that the distance between the central knife-edge and the downward-turned knife-edges 10 and 15 at either end are exactly the same, and it possesses sensibility in that it turns readily from its horizontal position when there is a slight excess of matter on either the scale-platform or the poise-beam. This frame or beam-lever 9 has its knife-edge 10 extending through the eye of the loop 12 of a rod 11, which rod has an upper loop 13 bearing upon a turned-upward knife-edge 14 of the short arm of a weighted lever 32, which lever oscillates upon a shaft 31, extending through the lever from the rear to the front of the standard 1. The long arm of this lever 32 is weighted as desired, so that the beam-lever 9 will rest in a horizontal position when the poise is at its extreme left movement on the beam, and has buffers 33 and 34 limiting its upward and downward movement, so that when weight is applied to the scale-platform the scale-rod 2 will be pulled down and likewise the frame 9, which will in its turn pull down the short arm of the lever 32 and raise the weighted end against the buffer 34. The other end of the frame 9 has a downward-turned knife-edge 15 resting within the looped end 17 of a rod 16, which has a hook 18 at its upper end resting within a U-loop 20, which has two upward-extending arms 19 and 25, each arm having at its upper end a loop 21 and 26, which bears upon oppositely-extending lateral pivots or upturned knife-edges 23 and 24, one of the pivots 23 extending forward from the front side of a plate or weighted short arm 27 and the other pivot 24 extending back from the rear side of a similar plate or weighted short arm 28. These two weighted arms 27 and 28 have a rear connecting portion 30, and near their other ends and extending from their sides are downward-turned knife-edges 35 and 36, which extend from these sides into the front and back of the machine, respectively, and upon which these short arms and the beam 22, which is attached to the rear side of the short arm 27, turns. In the slot 29 between these two short arms run racks 40 and 41, as will be hereinafter explained.

Upon the beam 22 and within a slotted opening 50 in the casing, which is cut away or slotted to allow the beam 22 to extend through the same from left to right, is the weight-poise 45, the movement of the poise upon the beam to the right being limited by the buffers or stops 48 49, which buffers also limit the up-and-down movement of the beam. This beam is normally horizontal, but not graduated, as is common in beam-scales, as it is not desired to indicate the weight upon the beam, as independent indicating mechanism is connected with this beam, and the weight weighed is indicated upon a dial by the movement of a pointer or hand 93; but a second graduated beam could be used with an indicating-hand to show the weight, as is readily understood.

The beam 22 is connected to the rear side of the weighted arm 27 and extends within the opening between these two weighted arms to just beyond the pinion 39, and the beam 22 is provided on its rear upper side with an elongated opening extending from near its left end to nearly its extreme right end, and in this opening within the beam is fastened a stationary rack-bar 42, having a series of teeth 54 on its under side, which teeth are in mesh with the gear 44, journaled to an arbor 46 in the lower part of the weight-poise 45.

Within the poise 45 is an opening 47, as is common in poises, allowing it to run or pass along the beam, and in the rear of this opening 47 the poise has a circular aperture 51, which is made a part of the opening 47, as shown in Figs. 5 and 6 of the drawings, and within which the gears 43 and 44 revolve. Within this aperture 51 is a gear 43, fast to the pinion 44 and revolving with it, which gear has teeth in mesh with the under teeth 52 of a horizontally-sliding rack 40, which rack is parallel with the beam 22 and is horizontally movable in a runway immediately below the opening for rack 42, and part of the teeth of rack 40 pass along a smooth forward-extending portion of rack 42 and part of the teeth 54 of rack 42 press against the rear upper side of rack 40, so that rack 40 is kept in place within the runway in the beam and extends beyond the long arm of the beam 22 and between the short or weighted arms 27 and 28. The upper teeth 53 of this rack 40 are engaged by the teeth of a pinion 39, which turns upon a pin 37, extending from one side 28 to the other side 27, and this pin may have an enlarged portion 38 pressing against the pinion 39 to keep the pinion in place, as shown in Fig. 17. This pinion 39 has also in mesh with it a rack 41, with teeth 55 on its under side, which rack extends upward at an angle diagonally to the beam 22 and the rack-bar 40.

Projecting toward the rear of the machine from the inner side of the rack 41 is a pin or projection 76 for limiting the downward movement of a bar 56, which bar has on its rear face a detent 74, as shown in Figs. 2 and 18, and this bar 56 is held upward in a normal position by a weighted lever 70, which weighted lever is in the rear of the machine just back of the bar 56 and is pivoted at 71 to the rear of the machine, having a downward-extending arm 72 just below the pivot 71 parallel with one side of the rack 56 and with a projection 73, forming a seat 75 for the detent 74.

Extending downward from the weighted lever is a wire 68, which has a foot-piece extending through an opening 67 of the long and narrow coin-chute 66, so that when a coin is placed within the chute it drops downward, striking the foot-piece and pressing the foot-piece and wire 68 downward and raising the weighted end of the lever 70, carrying downward its arm 72 and withdrawing the seat 75 of the projection 73 from the detent 74, and the bar 56 immediately descends diagonally downward until it reaches the stop 76, the wheels or disks 64 running in the runway or slotted portion 62 on the under side and the wheels or disks 65 on the upper side running in the runway or slotted portion 63 of the bar 56.

Attached to the bar 41 is a plate 111, having screw-holes 112 for receiving the screws by which it is attached to the bar and provided with hub-arms 115 and 116, the hub-arm 116 being provided with a hub 114 for receiving the shaft 96, which carries the small pinion 97, having its teeth in mesh with the teeth 95 on the upper side of a stationary rack-bar 94. This rack-bar 94 extends diagonally downward parallel to the bars 41, 56, and 58 and is connected on its lower side to the inner side of the plate 69 by a bolt or other means 131. An arm 77 extends inward from one side of the circular plate 69, and to this arm 77 is attached the upper end of the stationary bar 94 by a bolt or other means. The shaft 96 also carries on its forward portion a large gear 98, and as the rack 41 moves downward by the revolving of the pinion 39, as shown in Fig. 1, it carries with it the pinion 97 and gear 98.

The hub-arm 115 has the hub 113, which carries the shaft 99, which shaft carries the gears 100 and 101. The gear 100 is a small gear in mesh with the large gear 98, so that as the bar 41 descends downward the gear 98 turns the gear 100 and its shaft 99 and the gear 101. Attached by screws 132 to the outer side of bar 58 is a plate 102, which is provided with screw-holes 104 for receiving the screws 132 and with a boss 106, which is flattened at its lower side, so as not to interfere with rack 41, and is provided with a hole 105, extending through said boss, and plate 102 for receiving the screw by which is attached a plate 103 to its under side, the plate 103 being provided with a screw-hole 108 for receiving the screw extending through the boss 106. The long side of the plate 103 runs parallel with the upper side of bar 41 and can be made to slide against it. The upper end of the long side is narrowed, as at 121, (see Fig. 9,) and has extending backward from its rear side a pin or detent 109. Parallel with the detent 109 at the other end of said plate 103 is a similar detent or pin 110. Attached to the front side of plate 103 is a detent or knife-edge 107, which knife-edge is pointing diagonally downward when the plate is in place and serves as a pawl to gear 101 when in contact with one of its teeth.

A plate 127 is provided with a boss 128 and has an opening 129 extending through said plate and boss for receiving a pivot-pin 131, extending outward from the bar 56 and on which it is allowed to swing. This plate 127 is provided with a forward-projecting pin 122, which presses on the upper side of the wire 85, which wire extends parallel with the long sides of the bar 56, about two-thirds the length of the bar, and near the lower end of said bar it rests within a short elongated bearing 87, so that it is allowed a slight movement across the bar. At its upper end it rests within a similar bearing 86, so that this wire is allowed a little play at either end; but the wire is sufficiently rigid to prevent its springing out from said bearings.

The pin 122, resting on its upper side, prevents the fall of this weighted plate 127; but the plate is so shaped, as shown in Fig. 16, that the pin 122 will always press against this wire 85. At the extreme upper corner of the plate 127 is a detent 123, provided with a cam-shaped back, so that it will ride out beyond a pin 124 as the plate 127 is swung backward the thickness of the pin and will then immediately fall into position on the upper side of the pin 124 as the weight of the plate 127 carries it into position.

The pin 124 is attached to the rear side of the bar 58, and the bar 58 is provided with teeth 59 on its upper side in mesh with the pinion 90 on the indicator-shaft 92, which pinion normally holds the rack 58 at its extreme upward movement, and if the rack 58 had been carried downward by the weight of the rack 56, combined with its own weight, being greater than the weight of the segment 88 and because the rack 56, carrying the plate 127 and its detent 123 downward, the detent pressing downward the pin 124 and its rack 58 the teeth of the rack turning the pinion and its shaft and raising the segment 88, as will be hereinafter explained, then should the plate 127 be swung backward the pin 124 would be released and the weight of the segment 88 would overcome the weight of the rack 58 and raise it to its normal position, at the same time carrying the indicator-hand back to zero.

Extending downward from the inside of the top of the circular plate 69 is an arm 91 and in its rear and parallel with it is a similar arm 126, supported by the boss 133, and these arms are each provided with a boss through which extends the indicator-shaft 92. The indicator-shaft 92 is provided on its forward end with an indicator-hand 93, as shown in Figs. 1 and 2, for recording upon a graduated dial the weight upon the platform. The outline of the graduated dial is shown in dotted lines in Fig. 1; but as these dials are in every day use I deem it unnecessary to herein further show or describe it. The indicator-shaft 92 carries the pinion 90, having its teeth in mesh with the teeth 59 on the upper side of the rack-bar 58, and a similar gear 125 on the same shaft 92 in the rear of this pinion 90 engages the teeth of the weighted segment 88, which is pivoted at 89 on the extreme left of the upper part of the inner head of the standard.

The bar 58 runs upon the rollers 60 and 61, which rollers also revolve against the upper side of the bar 41. A roller 138 also engages with the upper side of the bar 58, and rollers 137 also run upon the under side of the bar 41. On the plate 77 is a forward-extending pin 134, and attached to the under side of the bar 41 is a plate 117, which is attached by a screw from the bar 41, extending through a screw-hole 118. This plate 117 carries a downward-projecting arm 119 and is also provided with a short arm 120, which rests against the long side of the plate 103, so that when the mechanism is nearly returned to its upward position and is nearly at rest the arm 119 strikes against the under side of the pin 134 and throws the knife-edge or pawl 107 into contact with the teeth.

When weight is applied to the scale-platform, the scale-rod 2 is pulled down and the right end of the bar 9 is likewise drawn down, carrying the weighted end of the lever 32, which is pivoted at 31 up against the buffer 34. The beam 22 has been pulled upward against the buffer 48 and the operator pushes the poise 45 along the beam until the beam is in a horizontal position, and in the ordinary scales a pointer on the poise would indicate by the graduations on the beam the weight upon the platform; but as there are no graduations upon the beam 22 the weight cannot be ascertained until the payment of the toll. The toll is put into the coin-chute 66 and descending downward strikes against the foot on the outer end of the wire 68 and operates the indicating parts. As the poise 45 has been moved outward the gears 43 and 44 have moved along the teeth on the under side of the rack-bars 40 and 42, the rack-bar 40 being carried along from left to right, revolving the pinion 39, which is in mesh with it, and carrying downward the rack-bar 41, so that when the poise is at its proper distance on the beam 22 the rack-bar 41 is carried a sufficient distance so that the proper weight may be indicated when the toll is paid. As the rack 41 is carried downward the pin 76, attached to its rear side, is likewise carried downward, and when the toll is dropped in the coin-chute the wire 68, pulling downward the free end of the lever 70, withdraws the projection 73 from the detent 74 and allows the rack 56 to slide downward, which slides downward because of its weight and because of the weight of the bar 58, as hereinbefore explained. The bar 56 carries downward with it the bar 58 by the detent 123 pressing against the pin 124 on the rear side of the bar 58, and the teeth of this bar 58 turn the pinion 90 and its shaft 92, likewise turning the pinion or gear 125 and raising the weighted segment 88.

There is attached to the weighted lever-arm 32 by a pin 79 a rod 78, which has at its upper end, above one side of the rack 41, a pin 80, to which is connected a rod 81, which rod 81 is pivoted at 82 and extends forward parallel with the wire 85 at 83 and has a forward-extending pin 84, which presses against the under side of the wire 85 between this wire and the bar 41, so that if the weight is moved upon the scale-platform the lever 32 moves either up or down, moving the rods 78 and 81 and pressing the pin 84 up hard against the wire 85, raising the wire against the pin 122, which raises the plate 127, throwing the detent 123 out of contact with the pin 124 and allowing this pin 124 and its racks 58 to be carried upward by the downward movement of the weighted segment 88, and the same is equally true if the weight-poise is moved upon the beam 22. For example, if the weight has just been obtained by the payment of the toll and the operator takes hold of the weight-poise and moves it any distance either way on the beam 22, the movement of the poise moves the inclined rack 41 either up or down, setting the gears 97, 98, 100, and 101 in motion, and the gear 101 having the pawl 107 in contact with it moves the plate 103 either to right or left, according to the direction in which the poise is moved, and presses the pin 109 or the pin 110 against the wire 85, the wire forcing pin 122 and its plate 127 upward and releasing the pin 124 and the bar 58 and allowing the weighted segment to carry the bar 58 upward. The indicator-hand is therefore carried back to zero and a new weight could not be ascertained until the poise is again moved to its position on the beam to correspond with the weight on the platform and another coin dropped into the coin-chute; but in order that the rack 56 may be carried upward to its normal position it is first necessary to carry the poise back to the extreme left movement upon the beam, which moves the pinion 39, carrying the rack 41 upward, the pin 76 carrying upward the rack 56 and the pivoted plate 127 allowing the detent 123 to pass around the pin 124 and become locked upon its upper side, locking the rack 56 on nearly the extreme up movement.

Having thus fully described our invention, what we claim as new, and desire to secure by Letters Patent, is—

1. In a beam-scale, a beam, a poise upon the beam whereby the beam may be balanced by hand and dial indicating mechanism independent of the poise for indicating weight after adjustment of the poise.

2. In a beam-scale, a poise operated by hand and mechanism for determining weight operated independently of the poise and arranged so that the mechanism must first be set in operation to ascertain the weight.

3. A beam-scale in combination with mechanism for automatically indicating weight and releasing the indicating mechanism when the weight is varied upon the scale-platform without moving of the poise, substantially as shown and described.

4. A beam-scale, in combination with mechanism for automatically operating the indicator-hand and releasing and sending the indicator-hand back to zero when weight upon scale-platform is changed.

5. A beam-scale, in combination with mechanism for automatically indicating the weight and releasing the indicating mechanism and allowing the hand to be carried back to its normal position without movement of poise upon the moving of weight upon scale-platform.

6. In a beam-scale having an indicator-hand, the combination with a beam of a poise upon said beam, and mechanism connecting the hand and poise for automatically operating the hand when mechanism is set in motion, substantially as shown and described.

7. In a beam-scale, the combination with a beam of a dial-indicator hand, a poise upon said beam for adjusting the weight, and mechanism that when set in motion will automatically operate the indicator-hand, substantially as shown and described.

8. In a beam-scale, a sliding rack, a beam, a poise freely movable upon said beam, a rack operated by said poise, a stop upon said rack for limiting the downward movement of the sliding rack and indicating the correct weight, substantially as shown and described.

9. In a beam-scale, a beam, a poise, a dial-indicator, an automatic actuating mechanism operating the indicator in combination with the prior movement of the poise upon the beam with devices for automatically reciprocating said mechanism by change of weight upon the scale-platform.

10. In a beam-scale, an independent indicator, a rack for actuating the indicator upon its downward movement, a beam, a poise upon the beam, and means connecting the poise and rack for limiting the downward movement of the rack.

11. In a beam-scale, a dial-indicator, a rack, means connecting the rack and indicator, a beam, a rack within the beam, a pinion meshing with and connecting the racks, a poise upon the beam and means connecting the poise and the rack within the beam so that the movement of the poise will move the beam.

12. In a beam-scale, having indicating mechanism, a beam, a stationary rack within said beam having downward-projecting teeth, a movable rack within said beam having teeth upon both its lower and upper sides, a poise freely movable upon said beam and having a gear in mesh with the teeth of the stationary rack and a smaller gear with teeth in mesh with the teeth on the lower side of the movable rack and means connecting the movable rack with the indicating mechanism, substantially as shown and described.

13. In a beam-scale, a beam, a poise movable longitudinally upon said beam, a fixed dial centered above said beam, a movable indicating-finger for said dial, and means connecting said poise with the indicating mechanism for indicating the weight substantially as shown and described.

14. In a beam-scale, a dial, an indicating-hand in combination with indicating mechanism for indicating weight upon said dial, a beam, a poise movable upon said beam, and mechanism for operating the indicating mechanism after the poise has been adjusted upon the beam, substantially as shown and described.

15. In a beam-scale, a beam, a poise movable upon said beam, a movable rack, means connecting the poise with said movable rack, indicating mechanism situated above the beam, a gear in mesh with the movable rack, a sliding rack having teeth in mesh with said gear and operated by the movement of the movable rack and provided with a stud for limiting the movement of the indicator-hand, substantially as shown and described.

16. A weighing-machine, comprising an indicator-operating shaft, a weighted segment for rotating the shaft in one direction, a pinion affixed to the shaft, a rack extending diagonally across the rear of the dial and having teeth in mesh with the teeth of the pinion for rotating the shaft in the opposite direction, means for holding the rack at its extreme upward movement, and means for disengaging the holding means.

17. In a weighing-machine, the combination of an indicator-operating shaft having a pinion, a weighted segment for holding said pinion and shaft in its normal position, a second pinion upon said shaft, an inclined rack having teeth in mesh with said second pinion, a weighted rack for operating the first rack and means for operating said weighted rack.

18. A weighing-machine, comprising an indicator-operating shaft, weight-actuated means for rotating the same in one direction, a pinion affixed to the shaft, a weighted rack for rotating the shaft in the opposite direction and means connecting the weighted rack to the pinion.

19. A machine of the character specified, comprising an indicator-operating shaft, a beam, a poise upon said beam, weight-actuated means for rotating the shaft and indicating the weight, means connecting the weight-actuated means with the poise, and weighted means for rotating the shaft in the opposite direction and carrying the indicating means back to zero upon the movement of the poise upon the beam in either direction or upon change of weight upon the scale-platform.

20. In a weighing-machine in combination with indicating mechanism of an independent rack disconnected from the indicating mechanism for operating the indicating mechanism, means for connecting the rack with the indicating mechanism and means for disconnecting said rack from the indicating mechanism.

21. In a beam-scale, the combination of a beam, a poise upon the beam, a scale-platform, mechanism for automatically indicating weight and means releasing the indicating mechanism when the poise is moved upon the beam and without moving of the weight upon scale-platform.

In testimony whereof we affix our signatures in presence of two witnesses.

WILLIS H. JORDAN.
CLIFFORD J. McLEOD.

Witnesses:
MARTHA E. GOODING,
CHARLES F. A. SMITH.